(12) United States Patent
Chen

(10) Patent No.: US 6,547,439 B2
(45) Date of Patent: Apr. 15, 2003

(54) BEARING DEVICE

(75) Inventor: Chien-Jung Chen, Kaohsiung (TW)

(73) Assignee: Yen Sun Technology Corp., Kaohsiung Hsien (TW)

( * ) Notice: Subject to any disclaimer, the term of this patent is extended or adjusted under 35 U.S.C. 154(b) by 0 days.

(21) Appl. No.: 09/828,821

(22) Filed: Apr. 10, 2001

(65) Prior Publication Data

US 2002/0146183 A1 Oct. 10, 2002

(51) Int. Cl.$^7$ ............................................. F16C 32/06
(52) U.S. Cl. ........................................ 384/114; 384/279
(58) Field of Search ................... 384/279, 288, 384/281, 114, 107

(56) References Cited

U.S. PATENT DOCUMENTS

| | | | | |
|---|---|---|---|---|
| 4,838,710 A | * | 6/1989 | Ohta et al. | 384/100 |
| 5,145,266 A | * | 9/1992 | Saneshige et al. | 384/132 |
| 6,086,257 A | * | 7/2000 | Lee | 384/129 |

* cited by examiner

*Primary Examiner*—Lenard A. Footland
(74) *Attorney, Agent, or Firm*—Birch, Stewart, Kolasch & Birch, LLP

(57) ABSTRACT

A bearing device is provided with an oil storage space. The oil storage space is an oil storage space that is formed in the bearing device, so that the lubricating oil stored in the oil storage space may gradually leak outward through the capillary pores of the bearing device, thereby slowing down the release velocity of the lubricating oil, and thereby increasing the lifetime of the bearing device.

6 Claims, 4 Drawing Sheets

BEARING DEVICE

BACKGROUND OF THE INVENTION

1. Field of the Invention

The present invention relates to a bearing device, and more particularly to a bearing device that can store a lubricating oil, whereby the stored lubricating oil is not easily lost, thereby increasing the lifetime of the bearing device.

2. Description of the Related Art

A conventional bearing device in accordance with the prior art shown in FIG. 1 comprises a housing 90 having a shaft seat 91 provided with a bearing 92 therein. The bearing 92 defines a shaft hole for pivot of a rotation shaft 94 of a rotor 93. The bearing 92 is usually a conventional oil-impregnated bearing or self-lubricating bearing. For providing a better lubricating effect to the bearing 92, the contact position of the bearing 92 and the rotation shaft 94 is provided with a recessed oil storage space 95, for storing the lubricating oil, so that the rotation shaft 94 and the bearing 92 can achieve a lubricating effect.

In the conventional bearing device, the surface of the rotation shaft 94 serves as a close face. However, the so-called oil-impregnated bearing or self-lubricating bearing 92 forms a non-tight loose fit with the surface of the rotation shaft 94. Thus, when the rotation shaft 94 is rotated, the lubricating oil gradually leaks outward from the contact face of the rotation shaft 94 and the bearing 92. When the conventional bearing device is used for a short period of time, the storing oil is lost, so that the contact face between the rotation shaft 94 and the bearing 92 lacks the lubricating oil to produce a rotation noise due to friction, thereby causing inconvenience of the rotation.

SUMMARY OF THE INVENTION

The primary objective of the present invention is to provide a bearing device, wherein the bearing device is provided with an oil storage space. The oil storage space is formed in a closed chamber of the bearing device, thereby slowing down the lost velocity of the lubricating oil stored in the oil storage space, such that the bearing device can maintain the optimal lubricating effect.

Another objective of the present invention is to provide a bearing device, wherein the bearing device has more oil storage space, such that the bearing device can store more lubricating oil, thereby largely increasing the lifetime of the bearing device.

In accordance with the present invention, there is provided a bearing device is provided with an oil storage space. The oil storage space is an oil storage space that is formed in the bearing device, so that the lubricating oil stored in the oil storage space may gradually leak outward through the capillary pores of the bearing device, thereby slowing down the release velocity of the lubricating oil, and thereby increasing the lifetime of the bearing device.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
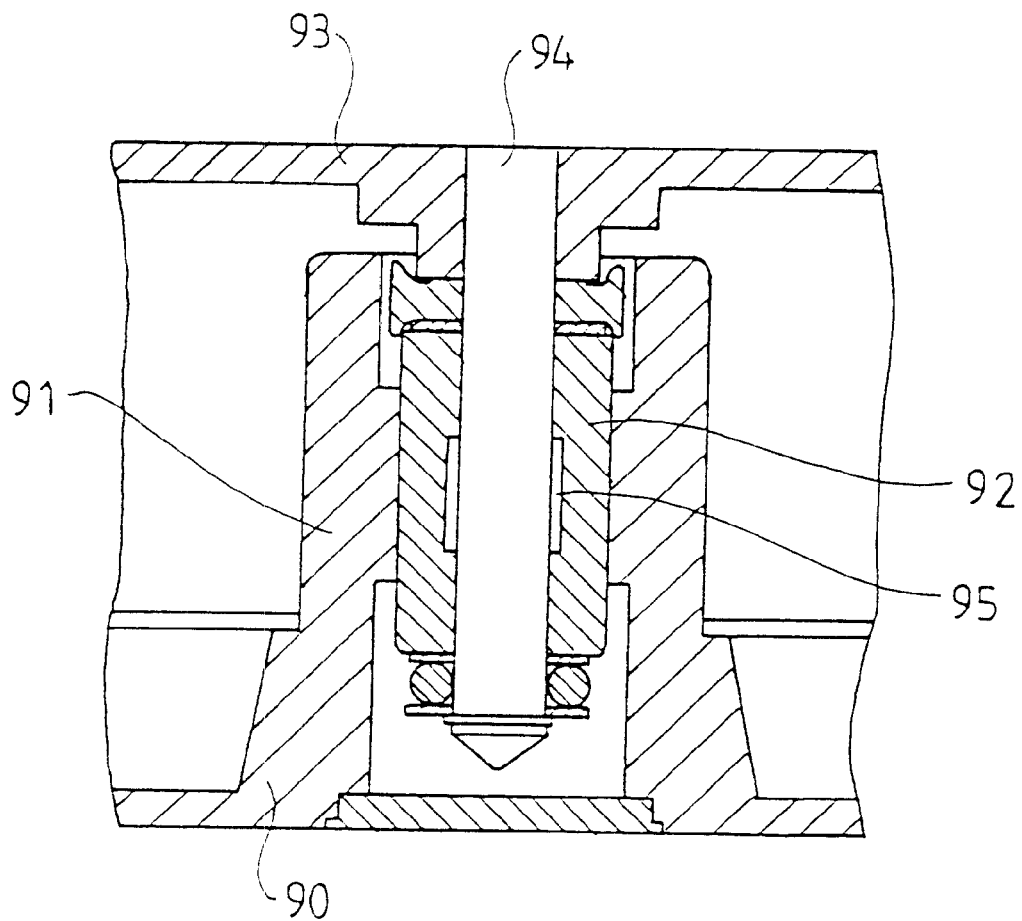
FIG. 1 is a cross-sectional assembly view of a conventional bearing device in accordance with the prior art.
Figure 3:
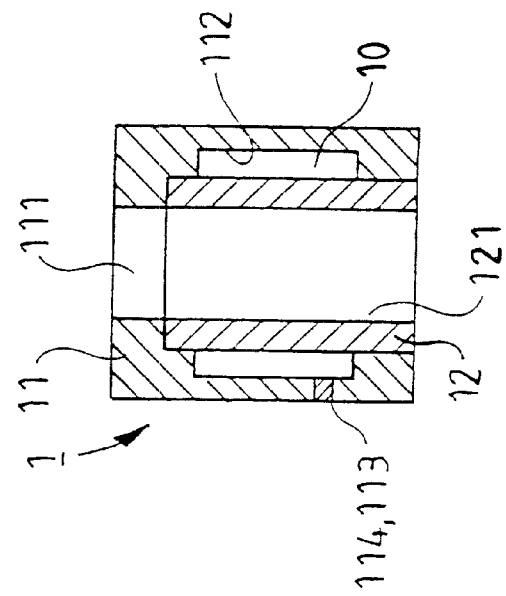
FIG. 3 is a front plan cross-sectional assembly view of the bearing device as shown in FIG. 1.
Figure 2:
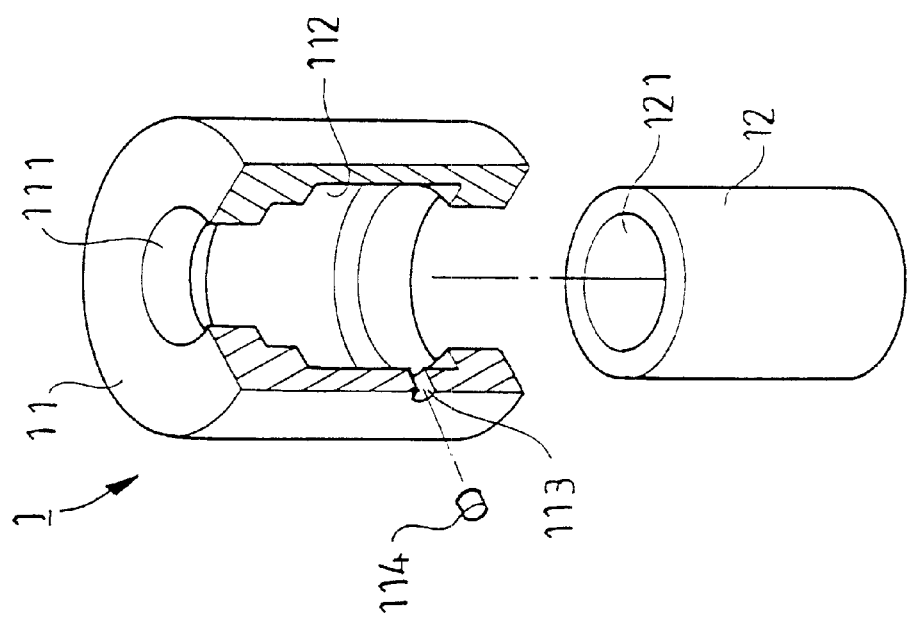
FIG. 2 is an exploded perspective view of a bearing device in accordance with a first embodiment of the present invention.

Referring to the drawings and initially to FIGS. 2 and 3, a bearing device 1 in accordance with a first embodiment of the present invention comprises a first ring 11, and a second ring 12. The first ring 11 and the second ring 12 can be combined with each other to form a bearing device 1 which contains an oil storage space 10 therein.

The first ring 11 has a shaft hole 111 for passage of the rotation shaft of the rotor. The wall of the shaft hole 111 of the first ring 11 is provided with slot hole 112 having an inner diameter greater than that of the shaft hole 111. The slot hole 112 may form a double-diameter stepwise hole.

The second ring 12 is placed in the first ring 11, and is formed with a shaft hole 121 for passage of the rotation shaft of the rotor. The second ring 12 is placed in the shaft hole 111 of the first ring 11, thereby closing the slot hole 112 of the first ring 11, so that the slot hole 112 forms a close oil storage space 10 in the bearing device 1. In the present embodiment, the second ring 12 is placed in the smaller diameter portion of the slot hole 112 that forms a double-diameter stepwise hole. The shaft hole 121 of the second ring 12 and the shaft hole 111 of the first ring 11 have the same inner diameter for pivot of the rotation shaft of the rotor to rotate. In addition, in the present embodiment, in the first ring 11 and the second ring 12, at least the second ring 12 is made of material having capillary pores for allowing leakage of the lubricating oil.

In addition, for facilitating the lubricating oil being filled into the oil storage space 10, and for facilitating the oil storage space 10 obtaining the maximum storage amount, the first ring 11 may be formed with a cavity 113, so that the lubricating oil can be easily filled into the oil storage space 10 through the cavity 113. The cavity 113 may be closed by a seal member 114, so that the lubricating oil can be stored without leakage.

As shown in FIG. 3, when the bearing device 1 in accordance with the present invention is formed by combining the first ring 11, and the second ring 12, the outer wall of the first ring 11 may be placed in a shaft seat or any position to be assembled in a close fit manner, while the shaft hole 121 of the second ring 12 allows pivot of the rotation shaft of the rotor to rotate. Thus, the close fit force arising from the first ring 11 may force the first ring 11 and the second ring 12 to form a close fit. Thus, the slot hole 112 provided by the first ring 11 is a close oil storage space 10 formed in the bearing device 1, and the lubricating oil stored in the oil storage space 10 will leak outward through the capillary pores of the second ring 12 due to rotation of the rotation shaft of the rotor, so that the wall face of the shaft hole 121 of the second ring 12 forms a lubricating oil film layer, such that the optimal lubricating effect is formed between the rotation shaft of the rotor and the bearing device 1. The lubricating oil gradually leaks outward through the capillary pores of the second ring 12, so that the release velocity of the lubricating oil is very slow, thereby increasing the lifetime of the bearing device.

Figure 4:
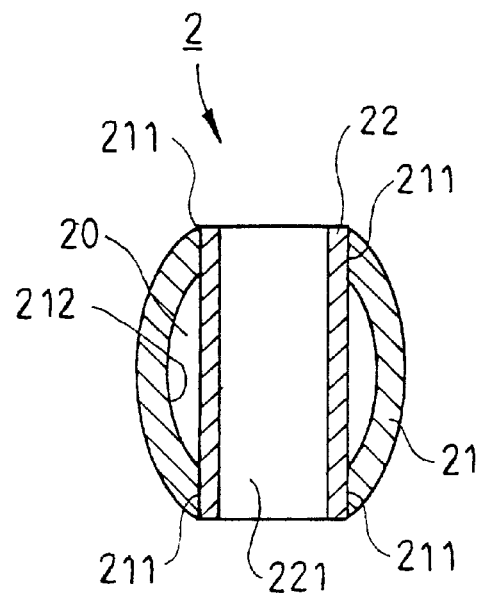
FIG. 4 is a front plan cross-sectional assembly view of in accordance with a second embodiment of the present invention.

Referring to FIG. 4, a bearing device 2 in accordance with a second embodiment of the present invention comprises a first ring 21, and a second ring 22. The outer wall face of the first ring 21 may be formed with a spherical face or an arcuate face which may be used in the technical field of the non-directional directional bearing. The second ring 22 is placed in the inner wall face of the first ring 21, and the inner wall face of the first ring 21 may also have a concave spherical face or arcuate face, thereby forming a recess 212. In addition, the inner wall of the first ring 21 and the outer wall of the second ring 22 at least have two annular closely abutting contact portions 211. Thus, the recess 212 between the first ring 21 and the second ring 22 forms the oil storage space 20 that is closed in the bearing device 2. The second ring 22 is also made of the material having capillary pores for allowing leakage of the lubricating oil. Thus, the lubricating oil stored in the oil storage space 20 will gradually leak outward through the capillary pores of the second ring 22 due to rotation of the rotation shaft of the rotor. Thus, the release velocity of the lubricating oil is very slow, thereby increasing the lifetime of the bearing device.

Figure 5:
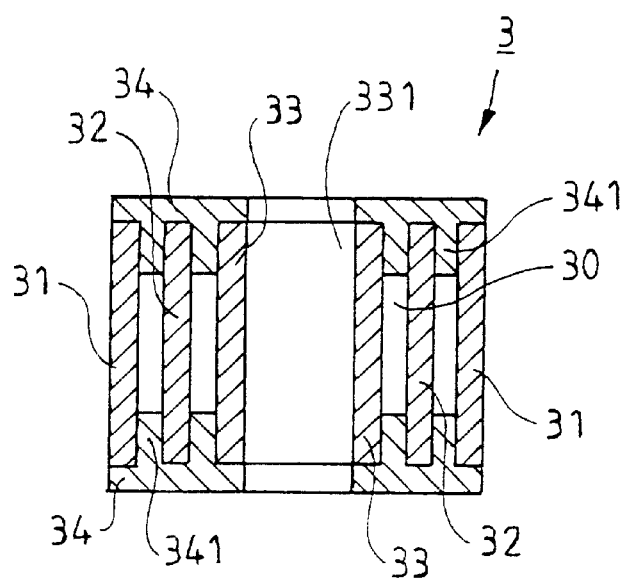
FIG. 5 is a front plan cross-sectional assembly view of in accordance with a third embodiment of the present invention.

Referring to FIG. 5, a bearing device 3 in accordance with a third embodiment of the present invention comprises three rings 31, 32 and 33 fitted in a concentrically manner. The two end faces of the three rings 31, 32 and 33 are closed by the close body 34. A proper distance is formed between adjacent wall faces of the three rings 31, 32 and 33, and the close body 34 is formed with protruding rings 341 extended into the distance. Thus, the distance of the three rings 31, 32 and 33 may form a close oil storage space 30. In the three rings 31, 32 and 33, the ring 33 having the smallest diameter has a shaft hole 331 for pivot of the rotation shaft of the rotor to rotate. In addition, the rings 32 and 33 may also be made of the material having capillary pores for allowing leakage of the lubricating oil. Thus, the lubricating oil stored in the oil storage space 30 will gradually leak outward through the capillary pores of the rings 32 and 33 toward the shaft hole 331 of the ring 33 due to rotation of the rotation shaft of the rotor. Thus, the bearing device of the present embodiment has a larger oil storage space 30, and the release velocity of the lubricating oil is very slow, thereby increasing the lifetime of the bearing device.

Figure 6:
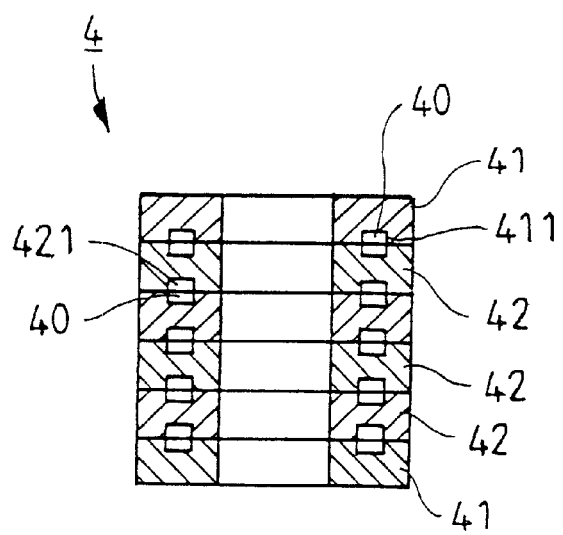
FIG. 6 is a front plan cross-sectional assembly view of in accordance with a fourth embodiment of the present invention.

Referring to FIG. 6, a bearing device 4 in accordance with a fourth embodiment of the present invention comprises two surface rings 41, and at least one inner ring 42. The outer walls of the surface rings 41 and the inner ring 42 have the same diameter, and the surface rings 41 and the inner ring 42 have the same inner diameter formed with a shaft hole for pivot of the rotation shaft of the rotor to rotate. The two surface rings 41 and the inner rings 42 are laminated with each other in a concentric manner, and the two surface rings 41 are covered on the top side and the bottom side of the inner rings 42. The contact faces of the two surface rings 41 and the inner rings 42 or the contact faces of the inner rings 42 are formed with annular grooves 411 and 421. Thus, after the surface rings 41 and the inner rings 42 are laminated with each other, and the outer ends of the surface rings 41 are fixed in place by fixing members, the annular grooves 411 and 421 formed by the contact faces of the two surface rings 41 and the inner rings 42 or the contact faces of the inner rings 42 form the close oil storage space 40. In addition, the surface rings 41 and the inner rings 42 may also be made of the material having capillary pores for allowing leakage of the lubricating oil. Thus, the lubricating oil stored in the oil storage space 40 will gradually leak outward through the capillary pores of the surface rings 41 and the inner rings 42 toward the shaft hole contacting the rotation shaft of the rotor due to rotation of the rotation shaft of the rotor. Thus, the bearing device of the present embodiment has a larger oil storage space 40, and the release velocity of the lubricating oil is very slow, thereby increasing the lifetime of the bearing device.

Figure 7:
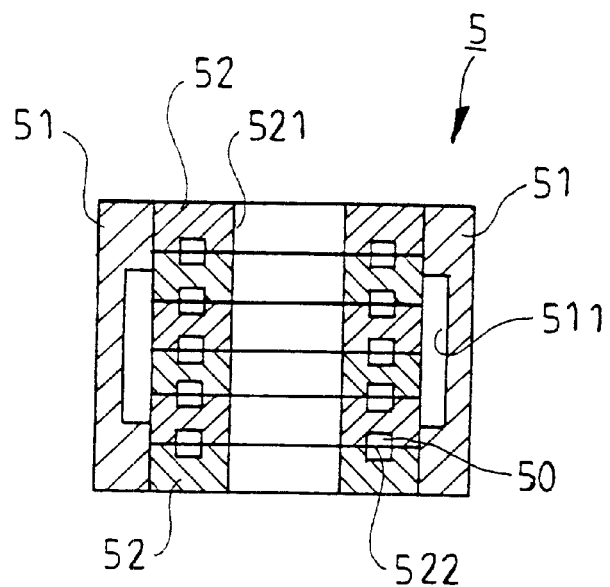
FIG. 7 is a front plan cross-sectional assembly view of in accordance with a fifth embodiment of the present invention.

Referring to FIG. 7, a bearing device 5 in accordance with a fifth embodiment of the present invention comprises an outer ring 51 and a plurality of inner rings 52. The outer ring 51 encompasses the outer wall faces of the inner rings 52. The inner wall face of the outer ring 51 has a concave inner annular groove 511. The inner rings 52 have the same outer diameter, and have the same inner diameter which forms a shaft hole 521. Each contact face of the inner ring 52 has an annular groove 522. When the inner rings 52 are placed in the outer ring 51, and the outer wall of the outer ring 51 is fixed in place by fixing members, the outer ring 51 and the outer wall of the inner ring 52 may form a close seal. Thus, the inner annular groove 511 of the outer ring 51, and each annular groove 522 of the inner rings 52 may respective form a close oil storage space 50. In addition, the inner rings 52 may also be made of the material having capillary pores for allowing leakage of the lubricating oil. Thus, the lubricating oil stored in the oil storage space 50 will gradually leak outward through the capillary pores of the inner rings 52 toward the shaft hole 521 contacting the rotation shaft of the rotor due to rotation of the rotation shaft of the rotor. Thus, the bearing device of the present embodiment has a larger oil storage space 50, and the release velocity of the lubricating oil is very slow, thereby increasing the lifetime of the bearing device.

In the bearing device in accordance with the present invention, a close oil storage space is formed in the bearing device, and the ring of the bearing device contacting the rotation shaft of the rotor is made of the material having capillary pores. Thus, the lubricating oil stored in the oil storage space will gradually and slowly leak outward through the capillary pores, so that the wall face of the shaft hole forms a lubricating oil film layer, such that the optimal lubricating effect is formed between the rotation shaft of the rotor and the bearing device. In addition, the lubricating oil only leaks outward through the capillary pores in a very small amount. Thus, the release velocity of the lubricating oil is very slow, thereby increasing the lifetime of the bearing device.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A bearing device, comprising:
    a first ring, having a shaft hole for passage of a rotation shaft of a rotor, said shaft hole having an inner wall defining a slot hole having a greater inner diameter, said slot hole forming a double-diameter stepwise hole;
    a second ring, having a shaft hole for passage of said rotation shaft of said rotor, said second ring having an outer wall placed in a smaller diameter portion of said double-diameter stepwise slot hole of said first ring, so that said slot hole of said first ring forms an oil storage space for storing a lubricating oil, said second ring having capillary pores so that said lubricating oil may leak outward.

2. The bearing device as claimed in claim 1, wherein said second ring has two surface rings and at least two inner rings laminated therebetween, said shaft hole is extended successively through the surface rings and the inner rings, a contact face being formed between two of said adjacent inner rings.

3. The bearing device as claimed in claim 2, wherein said contact face is formed between said surface ring.

4. The bearing device as claimed in claim 3 further comprises an annular groove provided on said contact surface to form a separated lubricant space.

5. The bearing device as claimed in claim 2, further comprises an annular groove provided on said contact surface to form a separated lubricant space.

6. The bearing device as claimed in claim 1, wherein said first ring is provided with a cavity for filling said lubricating oil into said oil storage space, and said cavity may be closed by a seal member.

\* \* \* \* \*